US012470993B2

(12) United States Patent
Khan et al.

(10) Patent No.: US 12,470,993 B2
(45) Date of Patent: Nov. 11, 2025

(54) SMALL CELL WITH PREDEFINED HANDOVER PARAMETERS

(71) Applicant: Outdoor Wireless Networks LLC, Richardson, TX (US)

(72) Inventors: Awaiz Ahmad Khan, Milpitas, CA (US); Utsaw Kumar, Sunnyvale, CA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 33 days.

(21) Appl. No.: 17/211,980

(22) Filed: Mar. 25, 2021

(65) Prior Publication Data

US 2021/0306925 A1    Sep. 30, 2021

Related U.S. Application Data

(60) Provisional application No. 63/002,978, filed on Mar. 31, 2020.

(51) Int. Cl.
*H04W 36/20* (2009.01)
*H04B 17/318* (2015.01)
(Continued)

(52) U.S. Cl.
CPC .......... *H04W 36/26* (2013.01); *H04B 17/318* (2015.01); *H04W 36/0058* (2018.08); *H04W 36/00837* (2018.08); *H04W 36/165* (2013.01)

(58) Field of Classification Search
USPC ...................................................... 370/331
See application file for complete search history.

(56) References Cited

U.S. PATENT DOCUMENTS

| 7,876,729 | B1 | 1/2011 | Grilli et al. |
| 8,000,719 | B1 * | 8/2011 | Lambert ............... H04W 64/00 |
| | | | 455/456.2 |

(Continued)

OTHER PUBLICATIONS

"He et al. "A simple and robust vertical handoff algorithm for heterogeneous wireless mobile 1-20 networks." Wireless Personal Communications 59.2 (2011): 361-373. Feb. 3, 2010".

(Continued)

*Primary Examiner* — Gregory B Sefcheck
*Assistant Examiner* — Majid Esmaeilian
(74) *Attorney, Agent, or Firm* — Fogg & Powers LLC

(57) ABSTRACT

A radio node in a network (such as a small cell) that receives predefined handover parameters is described. During operation, the radio node may receive, from a computer (such as a controller), information specifying the predefined handover parameters, where the predefined handover parameters correspond to a density of radio nodes in the network. For example, the radio node may provide, to the computer, information specifying the density of radio nodes in the network. Moreover, the radio node may receive, from the electronic device, information specifying a communication-performance metric associated with the radio node. Next, the radio node may provide, to the electronic device, a recommendation for a handover from the radio node to another radio node in the network based at least in part on the predefined handover parameters, the communication-performance metric and a second communication-performance metric associated with the other radio node.

20 Claims, 6 Drawing Sheets

(51) Int. Cl.
  *H04W 36/00* (2009.01)
  *H04W 36/16* (2009.01)
  *H04W 36/26* (2009.01)

(56) References Cited

U.S. PATENT DOCUMENTS

| | | | |
|---|---|---|---|
| 2001/0004604 A1* | 6/2001 | Toshimitsu | H01Q 1/246 455/562.1 |
| 2009/0122697 A1 | 5/2009 | Madhyasha et al. | |
| 2009/0285135 A1 | 11/2009 | Rousu et al. | |
| 2010/0290407 A1* | 11/2010 | Uemura | H04W 74/0866 370/329 |
| 2012/0014285 A1 | 1/2012 | Kalika et al. | |
| 2012/0170466 A1* | 7/2012 | Lee | H04W 24/02 370/252 |
| 2015/0016290 A1* | 1/2015 | Griesing | H04W 24/06 370/252 |
| 2017/0135020 A1 | 5/2017 | Kapoulas et al. | |
| 2019/0335343 A1* | 10/2019 | Panchal | H04W 76/10 |
| 2020/0097331 A1* | 3/2020 | Boehm | G06F 12/023 |
| 2020/0097437 A1* | 3/2020 | Boehm | G06F 15/17331 |
| 2020/0128415 A1* | 4/2020 | Venkataraman | H04W 72/10 |
| 2020/0205199 A1* | 6/2020 | Newman | H04L 1/1887 |
| 2020/0205200 A1* | 6/2020 | Newman | H04W 74/006 |
| 2020/0236555 A1* | 7/2020 | Tomeba | H04W 16/14 |
| 2020/0329530 A1* | 10/2020 | Holmberg | G06F 3/0673 |
| 2022/0070693 A1* | 3/2022 | Saghir | H04W 72/542 |
| 2022/0191737 A1* | 6/2022 | Mindler | H04W 28/0942 |
| 2023/0345257 A1* | 10/2023 | Bourgeois | H04W 24/08 |

OTHER PUBLICATIONS

Notification of Transmittal of the International Search Report and the Written Opinion of the International Searching Authority, or the Declaration for corresponding International Application No. PCT/US2021/024271, mailing date: Jul. 12, 2021, (14 pages).

* cited by examiner

SMALL CELL WITH PREDEFINED HANDOVER PARAMETERS

CROSS REFERENCE TO RELATED APPLICATIONS

This application claims priority under 35 U.S.C. 119(e) to: U.S. Provisional Application Ser. No. 63/002,978, "Small Cell with Predefined Handover Parameters," filed on Mar. 31, 2020, by Awaiz Ahmad Khan, et al, the contents of which are herein incorporated by reference.

FIELD

The described embodiments relate to techniques for communicating information among electronic devices. Notably, the described embodiments relate to techniques for providing predefined handover parameters in a small cell based at least in part on information specifying a density of radio nodes.

BACKGROUND

While many electronic devices communicate with each other via large networks owned by a network operator, small-scale networks associated with entities are increasingly common. For example, a cellular-telephone network provided by a mobile network operator includes so-called 'macrocells' with base stations, while a small cell is a type of small-scale network provided by a different entity, such as a company or an organization. A small cell includes radio access nodes (which are sometimes referred to as 'radio nodes') that provide lower power than macrocells. Therefore, small cells provide smaller coverage areas than macrocells.

In principle, small cells complement the service offered by a cellular-telephone network and can offer improved communication performance, such as in a particular venue or environment. In practice, it can be difficult to manage resources in a small cell, which can impact the communication performance.

For example, in order to determine when to perform a handover of an electronic device from a source radio node to a target radio node in a small cell, the source radio node may use handover parameters. However, for a given small cell or small-scale network, it can be difficult to determine the correct or optimal handover parameters. Moreover, inaccurate or sub-optimal handover parameters can degrade communication performance or disrupt service, and thus are frustrating to users.

SUMMARY

A radio node in a network (such as a small cell) that receives predefined handover parameters is described. This radio node includes: a first node or connector; a first interface circuit, coupled to the first node or connector, that communicates with an electronic device using a wireless communication protocol; a second node or connector; and a second interface circuit, coupled to the second node or connector, that communicates with one or more second radio nodes in the network and/or a computer using a wired communication protocol. During operation, the second interface circuit may receive, from the computer, information specifying the predefined handover parameters, where the predefined handover parameters correspond to a density of radio nodes in the network. Moreover, the first interface circuit may receive, from the electronic device, information specifying a communication-performance metric associated with the radio node. Next, the first interface circuit may provide, to the electronic device, a recommendation for a handover from the radio node to another radio node in the one or more second radio nodes based at least in part on the predefined handover parameters, the communication-performance metric and a second communication-performance metric associated with the other radio node in the one or more second radio nodes.

In some embodiments, the radio node may provide, to the computer, information specifying the density of radio nodes in the network.

Note that the information specifying the density of radio nodes may include an absolute density of radio nodes, such as a number of radio nodes per unit area. Alternatively or additionally, the information specifying the density of radio nodes may include a relative parameter characterizing the density of radio nodes, such as one of: sparse, moderate or dense.

Moreover, the communication-performance metric or the second communication-performance metric may include a reference signal receive power (RSPR). In some embodiments, the communication-performance metric and the second communication-performance metric are a common or same type of communication-performance metric.

Furthermore, the radio node may perform measurements of wireless signals associated with the one or more second radio nodes, including the second communication-performance metric associated with the other radio node in the one or more second radio nodes. For example, the radio node may perform a network listen for the wireless signals associated with the one or more second radio nodes. Alternatively or additionally, the radio node may receive, from the electronic device, information specifying the second communication-performance metric associated with the other radio node in the one or more second radio nodes.

In some embodiments, the predefined handover parameters may include: one or more measurement thresholds associated with measurements performed by the radio node or received from the electronic device, or a handover threshold used to determine when to perform the handover from the radio node to the other radio node in the one or more second radio nodes. For example, the one or more measurement thresholds may include: a first threshold used to cancel measurements associated with the one or more second radio nodes when the communication-performance metric of the radio node is increasing as a function of time and exceeds the first threshold; and/or a second threshold used to enable the measurements associated with the one or more second radio nodes when the communication-performance metric of the radio node is decreasing as a function of time and is less than the second threshold. Moreover, the predefined handover parameters may include: a third threshold that specifies a ratio when the radio node and the other radio node in the one or more second radio nodes use a common channel in a band of frequencies; or a fourth threshold used when the radio node and the other radio node in the one or more second radio nodes use different channels in the band of frequencies. Furthermore, the handover may be recommended when the communication-performance metric is less than the handover threshold and the second communication-performance metric is greater than the handover threshold.

Note that the wireless communication protocol may use a band of frequencies in a Citizens Broadband Radio Service (CBRS).

Moreover, the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Furthermore, in addition to the one or more predefined handover parameters, the radio node may receive, from the computer, information specifying transmit power of the radio node based at least in part on the density of radio nodes. For example, the minimum RSRP of the radio node may be between −12 dBm and −18 dBm, such as −15 dBm.

Another embodiment provides the computer.

Another embodiment provides a computer-readable storage medium with program instructions for use with the radio node or the computer. When executed by the radio node or the computer, the program instructions cause the radio node or the computer to perform at least some of the aforementioned operations in one or more of the preceding embodiments.

Another embodiment provides a method, which may be performed by the radio node or the computer. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
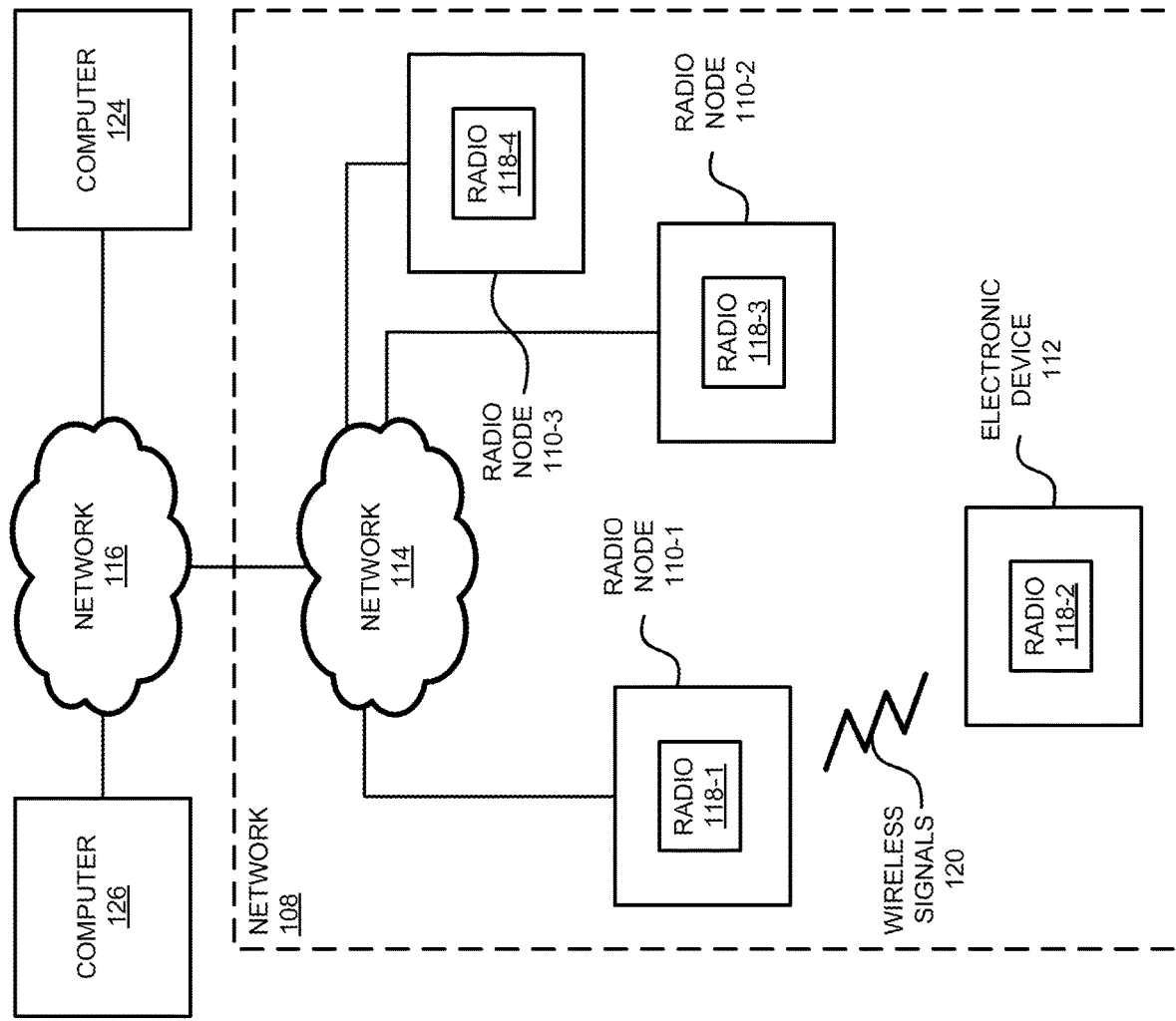
FIG. 1 is a block diagram illustrating an example of communication among a computer, radio nodes and electronic devices in a system in accordance with an embodiment of the present disclosure.

A radio node in a network (such as a small cell) that receives predefined handover parameters is described. During operation, the radio node may receive, from a computer (such as a controller), information specifying the predefined handover parameters, where the predefined handover parameters correspond to a density of radio nodes in the network. For example, the radio node may provide, to the computer, information specifying the density of radio nodes in the network. Moreover, the radio node may receive, from the electronic device, information specifying a communication-performance metric associated with the radio node. Next, the radio node may provide, to the electronic device, a recommendation for a handover from the radio node to another radio node in the network based at least in part on the predefined handover parameters, the communication-performance metric and a second communication-performance metric associated with the other radio node.

By configuring the radio node with the predefined handover parameters, these communication techniques may help reduce or eliminate the need for optimization and/or inaccuracies in the predefined handover parameters, which may facilitate handovers based at least in part on in the predefined handover parameters. For example, the communication techniques may facilitate accurate handovers in the network (such as a small cell) that includes the radio node and the one or more second radio nodes. Consequently, the communication techniques may provide improved communication performance and quality of service from the radio node and in the network.

We now describe some embodiments of the communication techniques. As discussed previously, a cellular-telephone network may include base stations (and associated cell towers) that implement macrocells. These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication techniques.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. While the use of femto cells and/or small cells can mitigate this challenge, there are still often circumstances where the network performance and quality of a cellular-telephone network is degraded. As noted previously, it can be difficult to determine the correct or optimal handover parameters. This can degrade or disrupt service, such as during handovers. These challenges are addressed in the communication techniques described below.

In the discussion that follows, Long Term Evolution or LTE (from the 3rd Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as another communication protocol). Thus, the radio nodes may include: an eNodeB, a UMTS NodeB and RNC, an NR gNB or gNodeB, etc.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among electronic devices according to some embodiments. Notably, radio nodes 110 in a network 108 (such as a small-scale network, e.g., small cell, a cellular-telephone network, etc.) can communicate LTE data frames or packets using LTE with an electronic device 112 (which is sometimes referred to as 'user equipment' or UE, such as a cellular telephone and, more generally, a fixed or portable electronic device). Again, while LTE is used as an example of a cellular protocol, the embodiments herein are not so limited. Moreover, radio nodes 110 may also communicate with each other via wireless or wired communication (such as Ethernet) in network 114 and/or computer 124 (such as a controller) or computer 126 (such as a spectrum allocation server or SAS) via wireless or wired communication (such as Ethernet) in network 116. Note that networks 114 and 116 may be the same or different networks. For example, networks 114 and/or 116 may an intra-net or the Internet.

Figure 2:
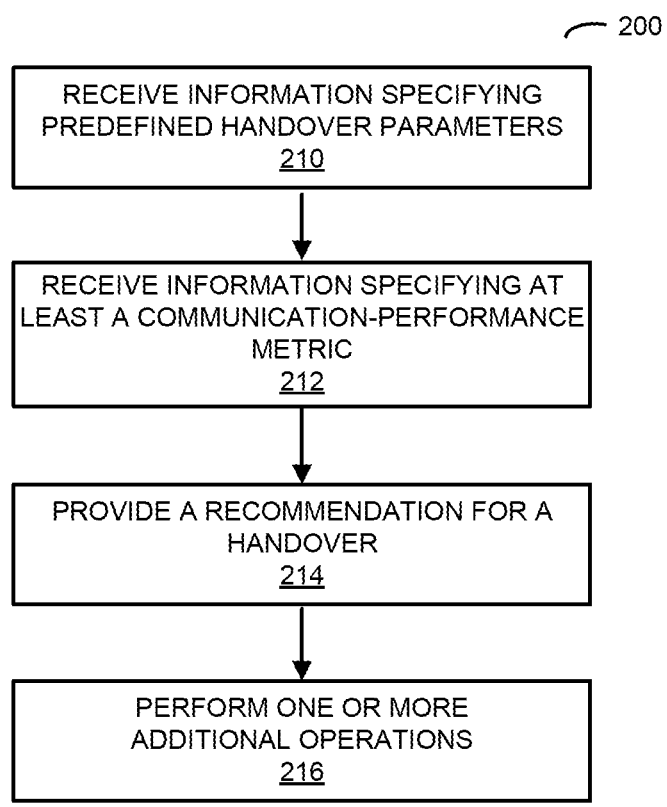
FIG. 2 is a flow diagram illustrating an example of a method for receiving predefined handover parameters using a radio node in FIG. 1 in accordance with an embodiment of the present disclosure.

As described further below with reference to FIGS. 2-4, one or more of radio nodes 110 and/or computer 124 may perform the communication techniques by communicating via network 114. Using radio node 110-1 as an example, this radio node may receive, from computer 124, information specifying predefined handover parameters, where the predefined handover parameters correspond to or may be specified by a density of radio nodes in network 108. For example, radio node 110-1 may receive the information specifying the predefined handover parameters in response to radio node 110-1 providing, to computer 124, information specifying the density of radio nodes in network 108. Note that the information specifying the density of radio nodes may include an absolute density of radio nodes, such as a number of radio nodes per unit area (e.g., four radio nodes per 10,000 ft$^2$). Alternatively or additionally, the information specifying the density of radio nodes may include a relative parameter characterizing the density of radio nodes, such as one of: 'sparse', 'moderate' or 'dense', which may correspond to categories or classification of different ranges of absolute densities of radio nodes and/or a location or position of radio node 110-1 relative to an edge of network 108. Notably, when radio node 110-1 is located near a center of network 108, the density of radio nodes may be 'dense', while, when radio node 110-1 is located near or at an edge of network 108, the density of radio nodes may be 'sparse'.

Moreover, radio node 110-1 may receive, from electronic device 112, information specifying a communication-performance metric associated with radio node 110-1. For example, electronic device 112 may measure an RSPR of electronic device 112, and may provide a result of the measurement to radio node 110-1. Alternatively or additionally, electronic device 112 may measure and report one or more other communication-performance metrics of radio node 110-1, such as a received signal strength indicator (RSSI), a pathloss, etc.

In some embodiments, alternatively or in addition to the measurements provided by electronic device 112, radio node 110-1 receives information specifying the communication-performance metric associated with radio node 110-1 from one or more of the remaining radio nodes 110 via network 114. Notably, the one or more of the remaining radio nodes 110 may perform a network listen for wireless signals associated with radio node 110-1 and may provide a result of this measurement to radio node 110-1. Similarly, in some embodiments, radio node 110-1 may perform a network listen for wireless signals associated with one or more of the remaining radio nodes 110, and radio node may determine one or more communication-performance metrics of the one or more remaining radio nodes 110 based at least in part on these measurements. Alternatively or additionally, in response to an instruction from radio node 110-1, electronic device 112 may measure the one or more communication-performance metrics of the one or more remaining radio nodes 110, and electronic device 112 may provide results of these measurements to radio node 110-1. For example, radio node 110-1 may provide an instruction to electronic device 112 to perform measurements for radio nodes 110-2 and 110-3 (such as a network scan) based at least in part on a neighbor-relationship table that includes information specifying neighboring radio nodes to radio node 110, such as a dynamically determined neighbor-relationship table or a common neighbor-relationship table that is used by radio nodes 110.

Then, radio node 110-1 may compare the measurement(s) of the one or more communication-performance metrics associated with radio node 110 and one or more of the remaining radio nodes 110 to one or more of the predefined handover parameters. Based at least in part on the comparison, radio node 110-1 may determine to provide a recommendation for a handover to electronic device 112, such as a recommendation for a handover from radio node 110-1 to radio node 110-2.

For example, the predefined handover parameters may include: one or more measurement thresholds associated with measurements performed by radio node 110-1 or received from electronic device 112, or a handover threshold used to determine when to perform the handover from radio node 110-1 to, e.g., radio node 110-2. Notably, radio node 110-1 may gate or select measurements performed by radio node 110-1, electronic device 112, and/or one or more of the remaining radio nodes 110 based at least in part on the one or more measurement thresholds. In some embodiments, the one or more measurement thresholds may include: a first threshold used to cancel or cease measurements associated with the one or more of radio nodes 110 when the communication-performance metric of radio node 110-1 (e.g., as measured by electronic device 112) is increasing as a function of time and exceeds the first threshold; and/or a second threshold used to enable the measurements associated with the one or more of radio nodes 110 when the communication-performance metric of radio node 110-1 (e.g., as measured by electronic device 112) is decreasing as a function of time and is less than the second threshold. Thus, the first threshold or the second threshold may be used to assess the performance costs associated with the measurements.

Moreover, the predefined handover parameters may include: a third threshold that specifies a ratio when radio node 110-1 and, e.g., radio node 110-2 use a common channel in a band of frequencies; or a fourth (absolute) threshold used when radio node 110-1 and, e.g., radio node 110-2 use different channels in the band of frequencies. Furthermore, the handover may be recommended when the communication-performance metric of radio node 110-1 is less than the handover threshold and the communication-performance metric of, e.g., radio node 110-2 is greater than the handover threshold.

Next, radio node 110-1 may provide, to electronic device 112, the recommendation for the handover. For example, radio node 110-1 may provide, to electronic device 112, information specifying a target radio node, such as radio node 110-2. This instruction may indicate a band of frequencies or a channel used by radio node 110-2. In some embodiments, radio node 110-1 may provide, via network 114, information about the handover to radio node 110-2, so that radio node 110-2 can establish a new connection with electronic device 112.

Note that the local (i.e., in proximity to one or more of radio nodes 110) or the global density of radio nodes may be determined by each of radio nodes 110. For example, radio node 110-1 may determine the local density of radio nodes based at least in part on a network listen for wireless signals from neighboring radio nodes in network 108 and/or based at least in part on information specifying locations of radio nodes 110 that is exchanged among radio nodes 110. Alternatively or additionally, controller 124 may determine the local or the global density of radio nodes based at least in part on the locations of radio nodes 110, which may be received from an operator of network 108, one or more installers of radio nodes 110 and/or from radio nodes 110. In some embodiments, the operator of network 108 may provide or specify to computer 124 the local or the global density of radio nodes in network 108. Thus, the local or global density of radio nodes may be determined in a distributed and/or a centralized manner. In the communication techniques, the locations of radio nodes 110 may be determined using: a Global Positioning System (GPS), a cellular-telephone network, a wireless local area network (WLAN), a local positioning system, triangulation and/or trilateration.

In some embodiments, the wireless communication in network 108 may use a shared-license-access band of frequencies. For example, the shared-license-access band of frequencies may include the CBRS near 3.5 GHz (such as the 150 MHz of bandwidth between 3.55 GHz and 3.7 GHz). Notably, a given radio node (such as radio node 110-1) may provide a grant request to computer 126 to reserve a portion of a spectrum or bandwidth (such as a portion of the spectrum in a shared-license-access band of frequencies or another band of frequencies) for its use. In some embodiments, radio node 110-1 may request a grant to reserve 5, 10, 20, 40, 80, 100 or 150 MHz of spectrum in CBRS from computer 126. In response, computer 126 may provide a grant response to radio node 110-1 with approval of a grant for the requested portion of the shared-license-access band of frequencies.

Then, radio node 110-1 may request from computer 126 authorization to transmit in the granted portion of the shared-license-access band of frequencies. For example, radio node 110-1 may provide a keep-alive message (such as a heartbeat request) to computer 126 in order to request authorization to transmit in the granted portion of the shared-license-access band of frequencies. When radio node 110-1 receives a keep-alive response from computer 126, then radio node 110-1 may be authorized to transmit in the granted portion of the shared-license-access band of frequencies until a transmit expire time has elapsed.

In these ways, the communication techniques may disseminate the predefined handover parameters to radio nodes 110 in network 108. This capability may provide improved communication performance and quality of service in network 108.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 6:
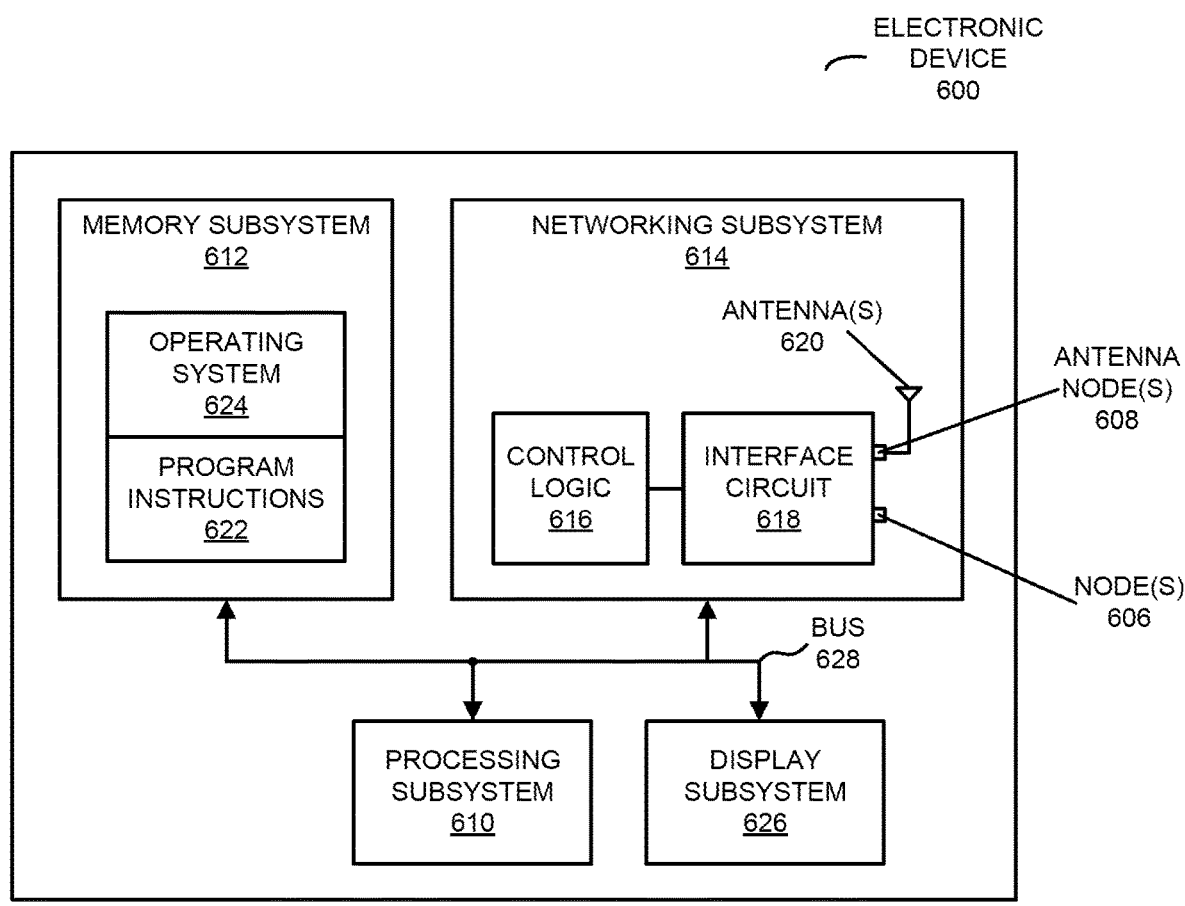
FIG. 6 is a block diagram illustrating an example of an electronic device in accordance with an embodiment of the present disclosure.

As described further below with reference to FIG. 6, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can include transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames or packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving frames that include packets.

We now describe embodiments of the methods. FIG. 2 presents a flow diagram illustrating an example of a method 200 for receiving predefined handover parameters, which may be performed by a radio node (such as one of radio nodes 110 in FIG. 1). During operation, a second interface circuit in the radio node may receive, from a computer (such as a controller of the radio node), information specifying the predefined handover parameters (operation 210), where the predefined handover parameters correspond to a density of radio nodes in a network that includes the radio node. Note that the information specifying the density of radio nodes may include an absolute density of radio nodes, such as a number of radio nodes per unit area. Alternatively or additionally, the information specifying the density of radio nodes may include a relative parameter characterizing the density of radio nodes, such as one of: sparse, moderate or dense.

Moreover, a first interface circuit in the radio node may receive, from an electronic device (such as a portable electronic device), information specifying at least a communication-performance metric (operation 212) associated with the radio node. Next, the first interface circuit may provide, to the electronic device, a recommendation for a handover (operation 214) from the radio node to another radio node in the one or more second radio nodes in the network based at least in part on the predefined handover parameters, the communication-performance metric and a second communication-performance metric associated with the other radio node in the one or more second radio nodes.

Note that the communication-performance metric or the second communication-performance metric may include a reference signal receive power (RSPR). In some embodiments, the communication-performance metric and the second communication-performance metric are a common or same type of communication-performance metric.

In some embodiments, the radio node optionally performs one or more additional operations (operation 216). For example, prior to receiving the information specifying the predefined handover parameters (operation 210), the radio node may provide, to the computer, information specifying the density of radio nodes in the network.

Moreover, the radio node may perform measurements of wireless signals associated with the one or more second radio nodes, including the second communication-performance metric associated with the other radio node in the one or more second radio nodes. For example, the radio node may perform a network listen for the wireless signals associated with the one or more second radio nodes. Alternatively or additionally, the radio node may receive, from the electronic device, information specifying the second communication-performance metric associated with the other radio node in the one or more second radio nodes.

In some embodiments, the predefined handover parameters may include: one or more measurement thresholds associated with measurements performed by the radio node or received from the electronic device, or a handover threshold used to determine when to perform the handover from the radio node to the other radio node in the one or more second radio nodes. For example, the one or more measurement thresholds may include: a first threshold used to cancel measurements associated with the one or more second radio nodes when the communication-performance metric of the radio node is increasing as a function of time and exceeds the first threshold; and/or a second threshold used to enable the measurements associated with the one or more second radio nodes when the communication-performance metric of the radio node is decreasing as a function of time and is less than the second threshold. Moreover, the predefined handover parameters may include: a third threshold that specifies a ratio when the radio node and the other radio node in the one or more second radio nodes use a common channel in a band of frequencies; or a fourth threshold used when the radio node and the other radio node in the one or more second radio nodes use different channels in the band of frequencies. Furthermore, the handover may be recommended when the communication-performance metric is less than the handover threshold and the second communication-performance metric is greater than the handover threshold.

Note that the wireless communication protocol may use a band of frequencies in the 0.

Moreover, the radio node may include: an eNodeB, a UMTS NodeB and RNC, an NR gNB or gNodeB.

In some embodiments of method 200, there may be additional or fewer operations. Furthermore, the order of the operations may be changed, and/or two or more operations may be combined into a single operation.

Figure 3:
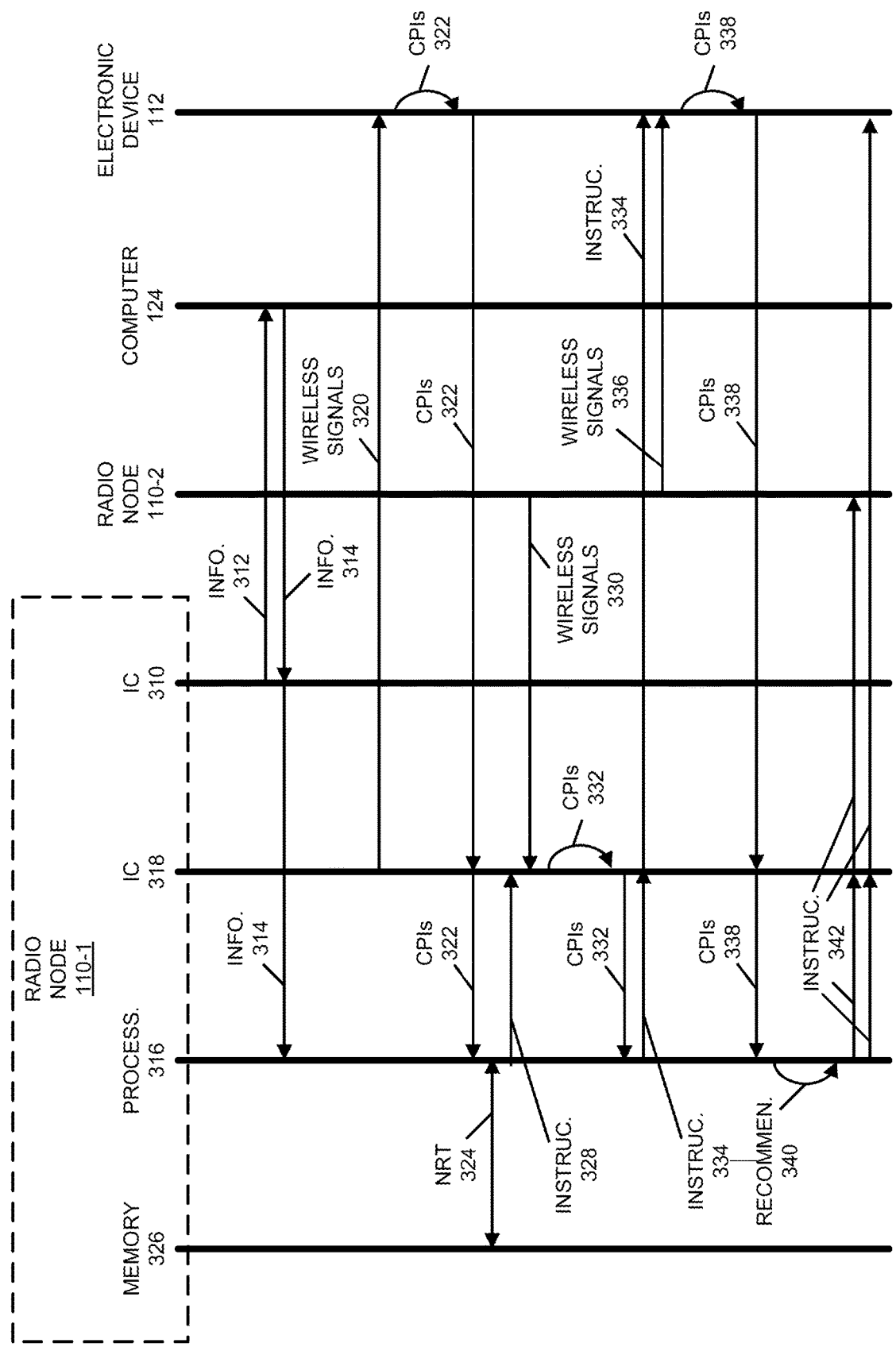
FIG. 3 is a drawing illustrating an example of communication among the electronic devices in FIG. 1 in accordance with an embodiment of the present disclosure.
Figure 4:
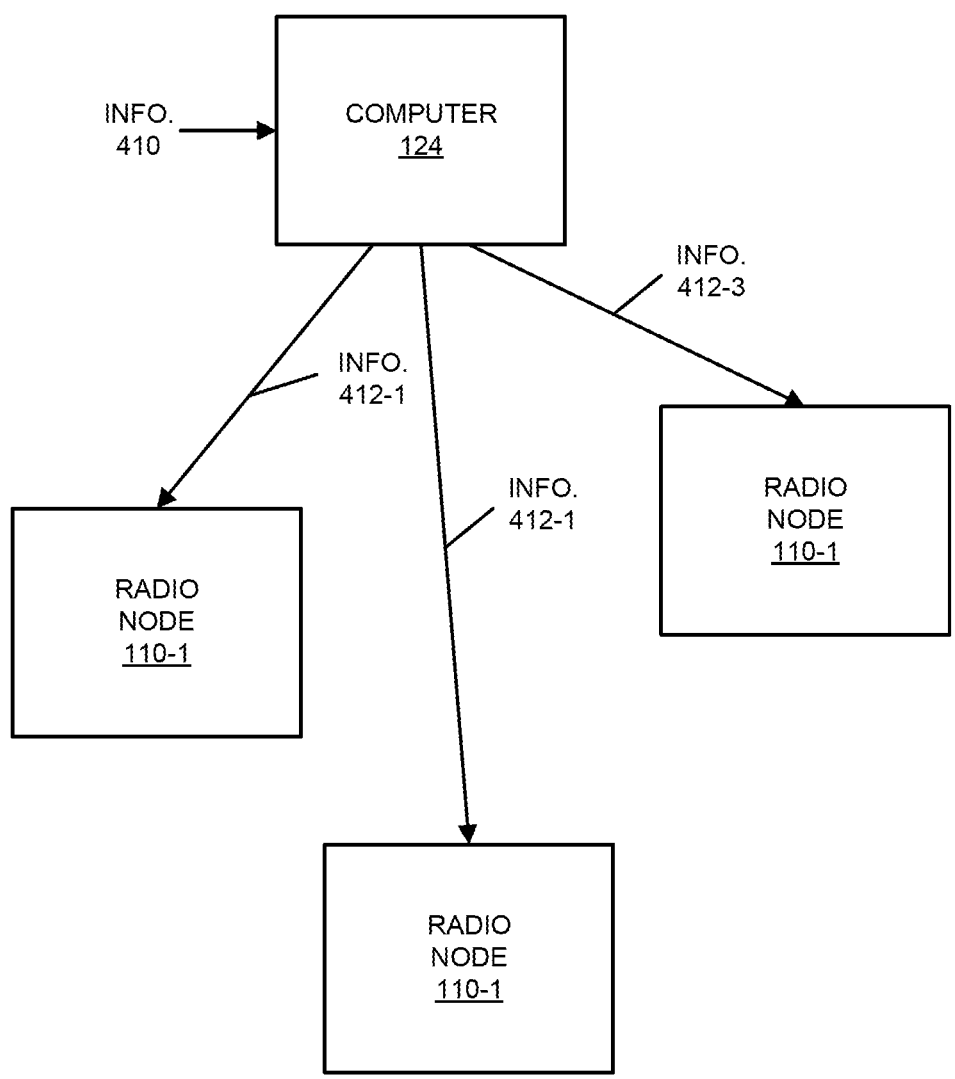
FIG. 4 is a drawing illustrating an example of a technique for distributing predefined handover parameters in accordance with an embodiment of the present disclosure.

Embodiments of the communication techniques are further illustrated in FIG. 3, which presents a drawing illustrating an example of communication among radio nodes 110, electronic device 112 and computer 124. In FIG. 3, an interface circuit (IC) 310 in radio node 110-1 may provide, to computer 124, information 312 specifying a density of radio nodes in a network. In response, computer 124 may provide information 314 specifying predefined handover parameters.

After receiving information 314, interface circuit 310 may provide information 314 to processor 316 in radio node 110-1. Moreover, interface circuit 318 in radio node 110-1 may receive, from electronic device 112, one or more communication-performance metrics (CPIs) 322 of or associated with wireless signals 320 transmitted by interface circuit 318 radio node 110-1. Then, interface circuit 318 may provide the one or more communication-performance metrics 322 to processor 316.

Based at least in part on one or more the predefined handover parameters (such as one or more measurement thresholds), the one or more communication-performance metrics 322 and/or a network-relationship table (NRT) 324 (with information about radio nodes 310 in a network) stored in memory 326 in radio node 110-1, processor 316 may instruct 328 interface circuit 318 to perform measurements of one or more communication-performance metrics 332 of or associated with wireless signals 330 transmitted by radio node 110-2. In response, interface circuit 318 may perform the measurements, and may provide the one or more communication-performance metrics 332 to processor 316.

Alternatively or additionally, processor 316 may provide instruction 334 to interface circuit 318, which provides instruction 334 to electronic device 112. In response, electronic device 112 may perform measurements of one or more communication-performance metrics 338 of or associated with wireless signals 336 transmitted by radio nodes 110-2. Then, electronic device 112 may provide the one or more communication-performance metrics 338 to interface circuit, which provides the one or more communication-performance metrics 338 to processor 316.

Next, based at least in part on one or more the predefined handover parameters (such as a handover threshold), the one or more communication-performance metrics 322, the one or more communication-performance metrics 332 and/or the one or more communication-performance metrics 338, processor 316 may determine to provide a recommendation 340 for a handover from radio node 110-1 to radio node 110-2. For example, the handover may be recommended when a communication-performance metric of radio node 110-1 is less than the handover threshold and a communication-performance metric of radio node 110-2 is greater than the handover threshold. Moreover, processor 316 may provide an instruction 342 for the recommended handover to interface circuit 310, which provides instruction 342 to electronic device 112 and/or radio node 110-2.

While FIG. 3 illustrates communication between components using unidirectional or bidirectional communication with lines having single arrows or double arrows, in general the communication in a given operation in this figure may involve unidirectional or bidirectional communication.

In some embodiments of the communication techniques, the predefined handover parameters are distributed to radio nodes in a small cell. This is shown in FIG. 4, which presents a drawing illustrating an example of a technique for distributing predefined handover parameters. Notably, computer 124 may receive information 410 specifying a density of radio nodes in a network. For example, information 410 may be received from radio node 110-1. Alternatively or additionally, information 410 may be received from an operator of the network. In some embodiments, computer 124 may determine the density of radio nodes in the network. In response to the information 410, computer 124 may provide, at least to radio node 110-1 (and possibly to one or more of the remaining radio nodes 110), information 412 specifying predefined handover parameters.

In this way, computer 124 may distribute the predefined handover parameters to one or more of radio nodes 110 that adapt to different densities of radio nodes in the network. This capability may allow radio nodes 110 to rapidly have access to accurate handover parameters (as opposed to performing a cumbersome and time-consuming optimization procedure in an attempt to determine the handover parameters), which may improve communication performance and the quality of service in the network.

In some embodiments, the predefined handover parameters include: a first threshold (such as an RSRP of −41 dBm) used by a radio node to cancel measurements associated with one or more second radio nodes in a network when a communication-performance metric of the radio node is increasing as a function of time and exceeds the first threshold; and/or a second threshold (such as an RSRP of −37 dBm) used by the radio node to enable the measurements associated with the one or more second radio nodes when the communication-performance metric of the radio node is decreasing as a function of time and is less than the second threshold. Moreover, the predefined handover parameters may include: a third threshold that specifies a ratio (such as 1-7 dB) used by the radio node when the radio node and the other radio node in the one or more second radio nodes use a common channel in a band of frequencies; or a fourth threshold (such as −37 dBm) used by the radio node when the radio node and the other radio node in the one or more second radio nodes use different channels in the band of frequencies. Furthermore, the handover may be recommended when the communication-performance metric is less than a handover threshold (such as −38 dBm) and the second communication-performance metric is greater than the handover threshold.

Tables 1-3 provide examples of the predefined handover parameters and predefined transmit power parameters for different densities of radio nodes.

TABLE 1

| Density: Moderate (8000 ft² ≤ access points pacing ≤ 20,000 ft²) | Value |
| --- | --- |
| First threshold (A1) | RSRP of −50 dBm |
| Second threshold (A2) | RSRP of −46 dBm |
| Fifth threshold1 (A5) | RSRP of −46 dBm |
| Fifth threshold2 (A5) | RSRP of −47 dBm |
| Minimum transmit power | RSRP of −15 dBm |
| Transmit power step size | 2 |

TABLE 2

| Density: Dense (access point spacing ≤ 8,000 ft²) | Value |
| --- | --- |
| First threshold (A1) | RSRP of −59 dBm |
| Second threshold (A2) | RSRP of −55 dBm |
| Fifth threshold1 (A5) | RSRP of −55 dBm |
| Fifth threshold2 (A5) | RSRP of −56 dBm |
| Minimum transmit power | RSRP of −18 dBm |
| Transmit power step size | 3 |

TABLE 3

| Density: Sparse (access point spacing 20,000 ft²) | Value |
| --- | --- |
| First threshold (A1) | RSRP of −41 dBm |
| Second threshold (A2) | RSRP of −37 dBm |
| Fifth threshold1 (A5) | RSRP of −37 dBm |
| Fifth threshold2 (A5) | RSRP of −38 dBm |
| Minimum transmit power | RSRP of −12 dBm |
| Transmit power step size | 1 |

Note that the predefined handover parameters may be precomputed for different densities of radio nodes in a network. In this way, the predefined handover parameters may be expressed or defined in terms of communication-performance metrics of the radio nodes (such as RSRP thresholds), instead of being expressed or defined in terms of pathloss.

In some embodiments, in addition to the one or more predefined handover parameters, the computer may provide information specifying transmit power of the radio node based at least in part on the density of radio nodes. For example, the minimum RSRP of the radio node may be between −12 dBm and −18 dBm, such as −15 dBm.

Figure 5:
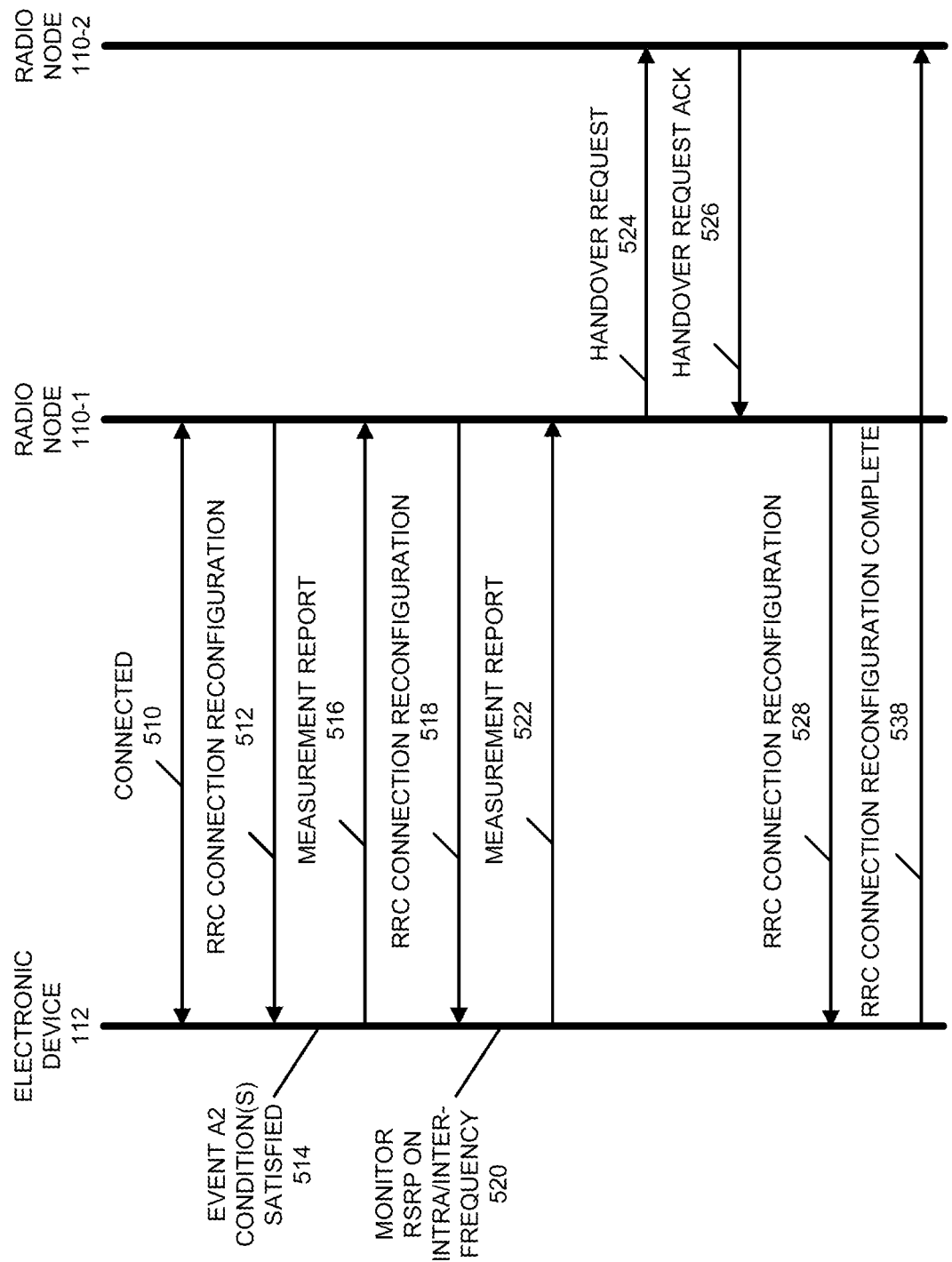
FIG. 5 is a drawing illustrating an example of communication among the electronic devices in FIG. 1 in accordance with an embodiment of the present disclosure.

FIG. 5 presents a drawing illustrating an example of communication among the electronic devices in FIG. 1 in accordance with an embodiment of the present disclosure. This communication illustrates how the predefined handover parameters may be used. Notably, electronic device 112 may communicate with a source radio node (radio node 110-1). For example, electronic device may be initially connected 510 to radio node 110-1. Then, radio node 110-1 may provide to electronic device 112 a radio resource control (RRC) connection reconfiguration message 512 with information that specifies the first threshold, the second threshold and/or the third threshold.

When the second threshold condition is satisfied 514 (such as when the serving frequency quality, e.g., the RSRP, falls below the second threshold), electronic device 112 may provide to radio node 110-1 a measurement report 516 that indicates that the second threshold condition is satisfied (which is sometimes referred to as a 'second type of event'). In response, radio node 110-1 may provide to electronic device 112 an RRC connection reconfiguration message 518 with information that specifies a fourth threshold, a handover threshold and/or a measurement gap configuration.

Then, electronic device 112 may monitor the RSRP on the intra/inter-frequency 520. Moreover, electronic device 112 may provide to radio node 110-1 a measurement report 522 that indicates that the fourth threshold or the handover threshold is satisfied (which are, respectively, sometimes referred to as a 'fourth type of event' or a 'fifth type of event').

Next, radio node 110-1 may provide to a target radio node (such as radio node 110-2) a handover request 524 (e.g., via an X2 interface). In response, radio node 110-2 may provide to radio node 110-1 a handover request acknowledgment 526 of ACK (e.g., via the X2 interface). Furthermore, radio node 110-1 may provide to electronic device 112 an RRC connection reconfiguration message 528 with information that specifies radio node 110-2, a physical cell identifier (PCI), a frequency used by radio node 110-2, etc.). Additionally, electronic device 112 may provide to radio node 110-2 an RRC connection reconfiguration complete message 530.

We now describe embodiments of an electronic device, which may perform at least some of the operations in the communication techniques. FIG. 6 presents a block diagram illustrating an example of an electronic device 600 in accordance with some embodiments, such as one of radio nodes 110, electronic device 112, computer 124 and/or computer 126. This electronic device includes processing subsystem 610, memory subsystem 612, and networking subsystem 614. Processing subsystem 610 includes one or more devices configured to perform computational operations. For example, processing subsystem 610 can include one or more microprocessors, graphics processing units (GPUs), ASICs, microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program instructions 622 or operating system 624), which may be executed by processing subsystem 610. Note that the one or more computer programs or program modules may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that includes one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as antenna nodes 608, e.g., a pad, which can be coupled to the one or more antennas 620, or nodes 606, which can be coupled to a wired or optical connection or link. Thus, electronic device 600 may or may not include the one or more antennas 620. Note that the one or more nodes 606 and/or antenna nodes 608 may constitute input(s) to and/or output(s) from electronic device 600.) For example, networking subsystem 614 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi© networking system), an Ethernet networking system, and/or another networking system.

Note that a transmit or receive antenna pattern (or antenna radiation pattern) of electronic device 600 may be adapted or changed using pattern shapers (such as reflectors) in one or more antennas 620 (or antenna elements), which can be independently and selectively electrically coupled to ground to steer the transmit antenna pattern in different directions. Thus, if one or more antennas 620 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wired or wireless communication techniques may be used. For example, instead of Ethernet, a communication protocol that is compatible with the Internet Protocol is used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Thus, the communication techniques may be implemented at runtime of program instructions 622. Alternatively or additionally, at least some of the operations in the communication techniques may be implemented in a physical layer, such as hardware in interface circuit 618.

While examples of numerical values are provided in the preceding discussion, in other embodiments different numerical values are used. Consequently, the numerical values provided are not intended to be limiting.

Moreover, while the preceding embodiments illustrated the use of the communication techniques with CBRS (e.g., a frequency band near 3.5 GHz), in other embodiments of the communication techniques different wireless signals and/or different frequency band(s) may be used. For example, the wireless signals may be communicated in one or more bands of frequencies, including: 900 MHz, 2.4 GHz, 5 GHz, 6 GHz, 60 GHz, and/or a band of frequencies used by LTE or another cellular-telephone communication protocol.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
    a first node or connector configured to communicatively couple to an antenna;
    a first interface circuit, communicatively coupled to the first node or connector, configured to communicate with an electronic device using a wireless communication protocol;
    a second node or connector configured to communicatively couple to a network;
    a second interface circuit, communicatively coupled to the second node or connector, configured to communicate with a computer using a wired communication protocol, wherein the radio node is configured to:
        receive, using the second interface circuit and associated with the computer, information specifying predefined handover parameters, wherein the predefined handover parameters correspond to classifications corresponding to a spatially varying density of radio nodes in the network that comprises the radio node, the density of radio nodes is based at least in part on a location of the radio node relative to an edge of the network, a range of the location extends from the edge of the network to a center of the network, the density of the radio nodes is higher at the center of the network than at the edge of the network, and the density of radio nodes is in an intermediate range of values between an instance of the radio node per 8,000 ft$^2$ and the instance of a radio node per 20,000 ft$^2$;
        receive, using the first interface circuit and associated with the electronic device, information specifying a communication-performance metric associated with the radio node; and
        provide, using the first interface circuit and addressed to the electronic device, a recommendation for a handover from the radio node to another radio node in the network based at least in part on the predefined handover parameters, the communication-performance metric and a second communication-performance metric associated with the other radio node.

2. The radio node of claim 1, wherein the network comprises a small cell.

3. The radio node of claim 1, wherein the radio node is configured to provide, using the second interface circuit and addressed to the computer, information specifying the density of radio nodes in the network.

4. The radio node of claim 3, wherein the information specifying the density of radio nodes comprises an absolute density of radio nodes.

5. The radio node of claim 3, wherein the information specifying the density of radio nodes comprises a relative parameter characterizing the density of radio nodes.

6. The radio node of claim 1, wherein the communication-performance metric or the second communication-performance metric comprises a reference signal receive power (RSPR).

7. The radio node of claim 1, wherein the communication-performance metric and the second communication-performance metric are a common type of communication-performance metric.

8. The radio node of claim 1, wherein the radio node is configured to perform measurements of wireless signals associated with one or more second radio nodes in the network, including the second communication-performance metric associated with the other radio node.

9. The radio node of claim 8, wherein the radio node is configured to perform a network listen for the wireless signals associated with the one or more second radio nodes.

10. The radio node of claim 1, wherein the radio node is configured to receive, using the first interface circuit and associated with the electronic device, information specifying the second communication-performance metric associated with the other radio node.

11. The radio node of claim 1, wherein the predefined handover parameters comprises: one or more measurement thresholds associated with measurements performed by the radio node or received from the electronic device, or a handover threshold used to determine when to perform the handover from the radio node to the other radio node.

12. The radio node of claim 11, wherein the one or more measurement thresholds comprises: a first threshold used to cancel measurements associated with one or more second radio nodes in the network when the communication-performance metric of the radio node is increasing as a function of time and exceeds the first threshold; or a second threshold used to enable the measurements associated with the one or more second radio nodes when the communication-performance metric of the radio node is decreasing as a function of time and is less than the second threshold.

13. The radio node of claim 12, wherein the predefined handover parameters comprise: a third threshold that specifies a ratio when the radio node and the other radio node use a common channel in a band of frequencies; or a fourth threshold used when the radio node and the other radio node use different channels in the band of frequencies.

14. The radio node of claim 1, wherein the handover is recommended when the communication-performance metric is less than a handover threshold and the second communication-performance metric is greater than the handover threshold.

15. The radio node of claim 1, wherein the wireless communication protocol uses a band of frequencies in a Citizens Broadband Radio Service (CBRS).

16. The radio node of claim 1, wherein the radio node comprises: an Evolved Node B (eNodeB), a Universal Mobile Telecommunications System (UMTS) NodeB and radio network controller (RNC), or a New Radio (NR) gNB or gNodeB.

17. A non-transitory computer-readable storage medium for use in conjunction with a radio node, the computer-readable storage medium storing program instructions that, when executed by the radio node, cause the radio node to perform operations comprising:
receiving, associated with a computer, information specifying predefined handover parameters, wherein the predefined handover parameters correspond to classifications corresponding to a spatially varying density of radio nodes in a network that comprises the radio node, the density of radio nodes is based at least in part on a location of the radio node relative to an edge of the network, a range of the location extends from the edge of the network to a center of the network, the density of the radio nodes is higher at the center of the network than at the edge of the network, and the density of radio nodes is in an intermediate range of values between an instance of the radio node per 8,000 ft$^2$ and the instance of a radio node per 20,000 ft$^2$;
receiving, associated with an electronic device, information specifying a communication-performance metric associated with the radio node; and
providing, addressed to the electronic device, a recommendation for a handover from the radio node to another radio node in the network based at least in part on the predefined handover parameters, the communication-performance metric and a second communication-performance metric associated with the other radio node.

18. The non-transitory computer-readable storage medium of claim 17, wherein the operations comprise providing, addressed to the computer, information specifying the density of radio nodes in the network.

19. The non-transitory computer-readable storage medium of claim 17, wherein the operations comprise:
performing measurements of wireless signals associated with one or more second radio nodes in the network, including the second communication-performance metric associated with the other radio node; or
receiving, associated with the electronic device, information specifying the second communication-performance metric associated with the other radio node.

20. A method for receiving predefined handover parameters, comprising:
by a radio node:
receiving, associated with a computer, information specifying predefined handover parameters, wherein the predefined handover parameters correspond to classifications corresponding to a spatially varying density of radio nodes in a network that comprises the radio node, the density of radio nodes is based at least in part on a location of the radio node relative to an edge of the network, a range of the location extends from the edge of the network to a center of the network, the density of the radio nodes is higher at the center of the network than at the edge of the network, and the density of radio nodes is in an intermediate range of values between an instance of the radio node per 8,000 ft$^2$ and the instance of a radio node per 20,000 ft$^2$;
receiving, associated with an electronic device, information specifying a communication-performance metric associated with the radio node; and
providing, addressed to the electronic device, a recommendation for a handover from the radio node to another radio node in the network based at least in part on the predefined handover parameters, the communication-performance metric and a second communication-performance metric associated with the other radio node.

* * * * *